US006236497B1

(12) United States Patent
Andersen et al.

(10) Patent No.: US 6,236,497 B1
(45) Date of Patent: May 22, 2001

(54) DIRECT FREE SPACE PUMP SIGNAL MIXING FOR EDFA

(75) Inventors: Bo Asp Moller Andersen, Bridgewater; Ernest Eisenhardt Bergmann, Lehigh, both of NJ (US); Carl Edward Gaebe, Fleetwood, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/201,454

(22) Filed: Nov. 30, 1998

(51) Int. Cl.$^7$ ........................................... H01S 3/00
(52) U.S. Cl. ................................................. 359/341
(58) Field of Search ................... 359/341; 372/6

(56) References Cited

U.S. PATENT DOCUMENTS

| | | | |
|---|---|---|---|
| 3,875,422 | * | 4/1975 | Stolen .................................. 307/88.3 |
| 5,119,229 | * | 6/1992 | Graso et al. ........................... 359/341 |
| 5,161,050 | * | 11/1992 | Grasso et al. ......................... 359/341 |
| 5,195,149 | * | 3/1993 | Pfeiffer et al. .......................... 385/28 |
| 5,659,644 | * | 8/1997 | DiGiovanni et al. ................... 385/31 |
| 5,867,305 | * | 2/1999 | Waarts et al. ......................... 359/341 |
| 5,920,582 | * | 7/1999 | Bycon ..................................... 372/6 |
| 6,031,849 | * | 2/2000 | Ball et al. ............................... 372/6 |
| 6,043,929 | * | 3/2000 | Delavaux ............................. 359/337 |

* cited by examiner

Primary Examiner—Mark Hellner
(74) Attorney, Agent, or Firm—Darby & Darby

(57) ABSTRACT

An erbium doped fiber amplifier includes a wavelength division multiplexer (WDM) which receives a data signal having a first wavelength through a first optical fiber which is single-mode at the first wavelength. Pump light supplied by an energy pump has a second wavelength shorter than the first. The pump light is provided through a second optical fiber which is multi-mode at the pump wavelength. The data signal and the pump light are multiplexed by the WDM. A third optical fiber is coupled to the WDM to receive the multiplexed output. The third fiber is single-mode at the data signal wavelength and multi-mode at the pump wavelength. The third fiber is erbium doped to amplify the input the data signal or is connected to a suitably doped fiber.

11 Claims, 5 Drawing Sheets

DIRECT FREE SPACE PUMP SIGNAL MIXING FOR EDFA

TECHNICAL FIELD

This invention is related to an erbium doped fiber amplifier (EDFA). More particularly, this invention relates to an amplifier design which provides for simplified alignment and better matching between components.

BACKGROUND OF THE INVENTION

In various optical communication applications, it is necessary to amplify an optically transmitted data signal. One method of amplifying optical signals is through the use of a doped fiber amplifier, such as an erbium doped fiber amplifier (EDFA). Fiber amplifiers of this type receive pump light of a first wavelength and transfer its energy to an input optical signal of a second wavelength. For example, in an EDFA, erbium doped fibers absorb the energy in applied pump light having a wavelength in the range of 980 nm. The presence of a 1550 nm input signal in the erbium fiber stimulates the fiber to emit the stored energy at the input signal 1550 nm wavelength, thus amplifying the input signal. Although various mechanisms are suitable for coupling the 980 nm pump light into the erbium doped fiber (EDF), the pump light is conventionally supplied by a laser and combined with the 1550 nm signal in the EDFA using a wavelength division multiplexer (WDM). Other dopants, which are typically rare earth elements, may be used to produce fiber amplifiers operating with other pump and signal wavelengths.

In conventional EDFA systems, the 1550 nm input data signal is supplied to the WDM from a 1550 nm single-mode optical fiber. In other words, the fiber has a core region small enough to prevent the data signal from propagating in more than one spatial mode. The pump energy is coupled to the WDM by a second fiber. Conventionally, this fiber is single mode at the shorter pump wavelength (980 nm) and therefore has a narrower core than the first fiber. The 1550 nm and 980 nm light sources are combined by directing them at an appropriate multiplexing device, such as a dichroic mirror or a prism assembly.

The combination of pump and input signal energy is directed into a third (output) optical fiber. The core of the third optical fiber is conventionally chosen to be single mode for both the 980 nm pump energy and the 1550 nm data signal. The output fiber may be erbium doped or may be coupled to a separate erbium doped fiber. The erbium doped fiber absorbs the 980 nm pump light and amplifies the 1550 nm input data signal.

As is apparent, one characteristic of a conventional EDFA is that the optical fibers which carry the pump light are single mode fibers for the shorter pump wavelength. Because of the smaller core size required for single-mode propagation at the shorter wavelength, aligning optical components to receive and/or direct a light signal into the end of the fiber requires a higher degree of precision. Because of this, conventional EDFAs must be manufactured with tighter design tolerances than if a fiber having a wider core were used. In addition, because of the demanding precision required to align the optical components, a relatively large number of devices must be rejected during the manufacturing process. Finally, while a single mode fiber is used to carry the pump light to the WDM, fiber that is single mode at the pump wavelength is not conventionally used on WDM inputs or outputs, which do not carry the pump light. Because different fiber types are used for input to and output from the WDM, a mode mismatch situation occurs, and the accompanying decrease in coupling efficiency results in a noticeable degree of signal loss.

SUMMARY OF THE INVENTION

These and other problems are solved according to the present invention by the use of optical fiber which is single mode for the longer wavelength data signal but multi-mode for the shorter wavelength pump light. Although multi-mode transmission of the pump light results in a loss of information with regard to the position of the pump light within the fiber, in the context of a doped fiber amplifier, such as an EDFA, the pump light is only used to excite the doped fiber. The information loss associated with a multi-mode light transmission is irrelevant so long as the pump light energy is ultimately absorbed.

Advantageously, aligning optical components to transmit and receive light through optical fibers having a core and mode size large enough to permit multi-mode transmission of the pump light is easier than aligning similar components using a conventional optical fiber, which has a core small enough that the pump light propagates in a single mode. Furthermore, using a multi-mode fiber of this type allows the amplifier to utilize the same kind of fiber for input and output signals, thus making it easier to design the intermediate optical lens system and to reduce mode mismatch coupling losses.

According to a preferred embodiment of the invention, the optical coupling between the signal input and output fibers and the WDM are contained in a single housing. Also situated within the housing is a pump laser optical subassembly having an output directed into the WDM. The direct coupling of the pump light in this manner eliminates the need to use additional fiber optic cable to couple the pump light to the WDM device, thus reducing the number of components which must be aligned, and therefore fabrication cost.

BRIEF DESCRIPTION OF THE DRAWINGS

The foregoing and other features of the present invention will be more readily apparent from the following detailed description and drawings of illustrated embodiments of the invention in which.

DETAILED DESCRIPTION OF THE PREFERRED EMBODIMENTS

Figure 1:
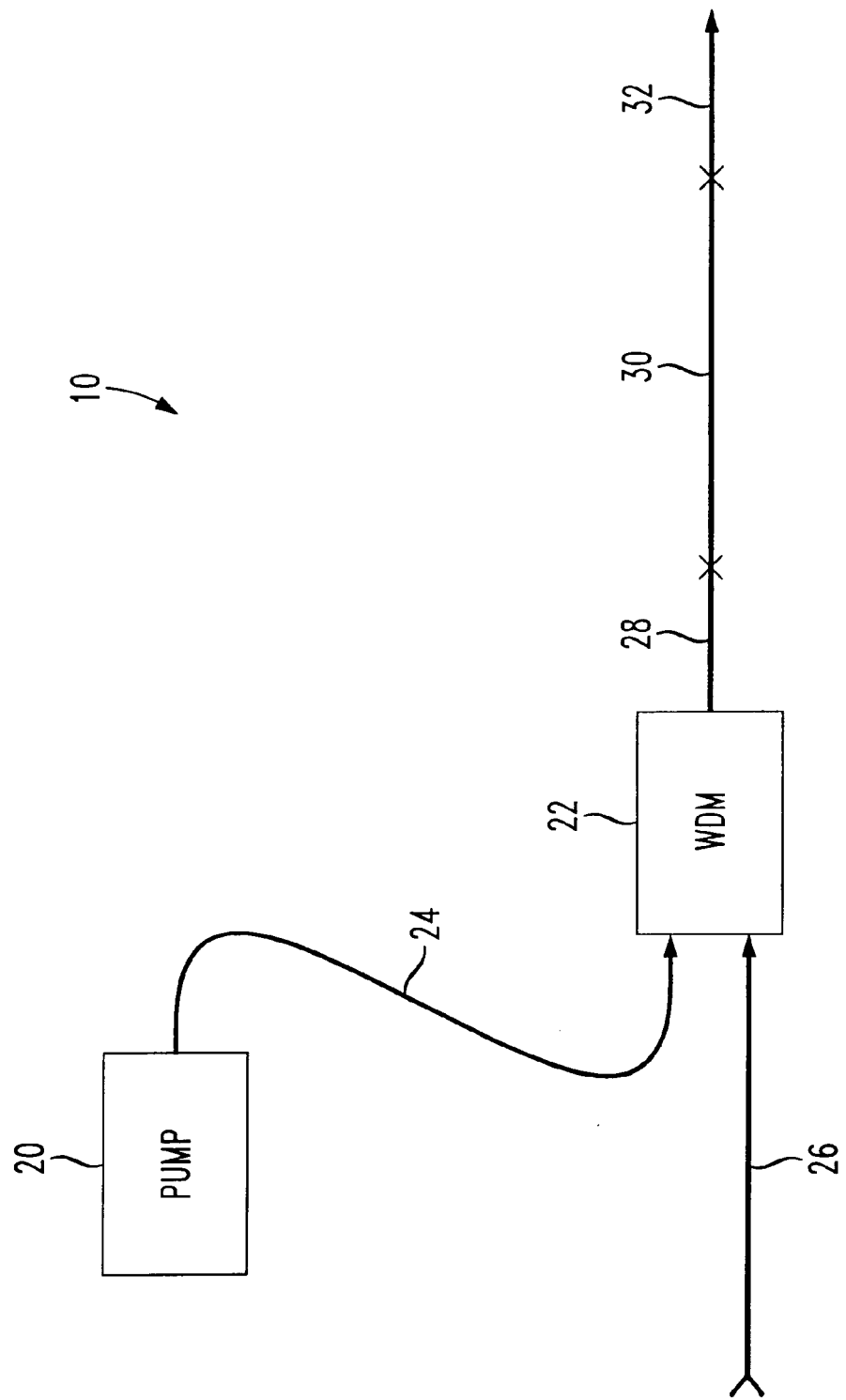
FIG. 1 is a schematic illustration of an erbium doped fiber amplifier according to the invention.

Turning to FIG. 1, there is shown a doped fiber amplifier, and in particular an erbium doped fiber amplifier (EDFA) 10 receiving pump light from a pump laser 20 and including a wavelength division multiplexer 22 (WDM). The pump 20 emits light energy at a wavelength suitable for exciting an amplification fiber. In the preferred embodiment, the amplification fiber is an optical fiber doped with an material such as erbium. When using erbium doped fibers, pump light preferably has a wavelength of substantially 980 nm. Although the invention is discussed below with specific respect to erbium doped optical fibers, it should be understood that other dopants may be used instead and further, that the term "optical fiber" also includes other similar light-transmitting devices, such as a planar light guide circuit.

The pump light is input to the WDM 22 through an optical fiber 24. Also coupled to the WDM 22 is a second optical fiber 26. This fiber 26 is used to supply an input data signal having a wavelength longer than the wavelength of the pump light. For erbium doped fiber amplifiers, the data signal wavelength is preferably in the range of 1550 nm. Fiber 26 has properties such that the data signal is carried in a single mode.

In this embodiment, the pump light and data signal are combined by the WDM 22 and output on a third optical fiber 28. According to the invention, fiber 28 has optical properties such that the data signal propagates in a single mode while the shorter wavelength pump light is multi-mode within the fiber 28.

Optical fiber 28 may be doped, i.e., with erbium, to transfer the energy in the pump light to the data signal. However, since erbium fiber is relatively expensive, preferably fiber 28, which connects to the WDM 22, is a standard optical fiber that is single mode at the data signal wavelength. A separate erbium fiber 30 is then coupled to the fiber 28 as illustrated in FIG. 1. In this arrangement, the erbium fiber 30 may be replaced as needed while leaving the fibers connected directly to the WDM 22 uncharged. A standard optical fiber 32 which transmits the data signal in a single mode can then be connected at the opposite end of the erbium doped fiber 30 to carry the amplified data signal.

Figure 2A:
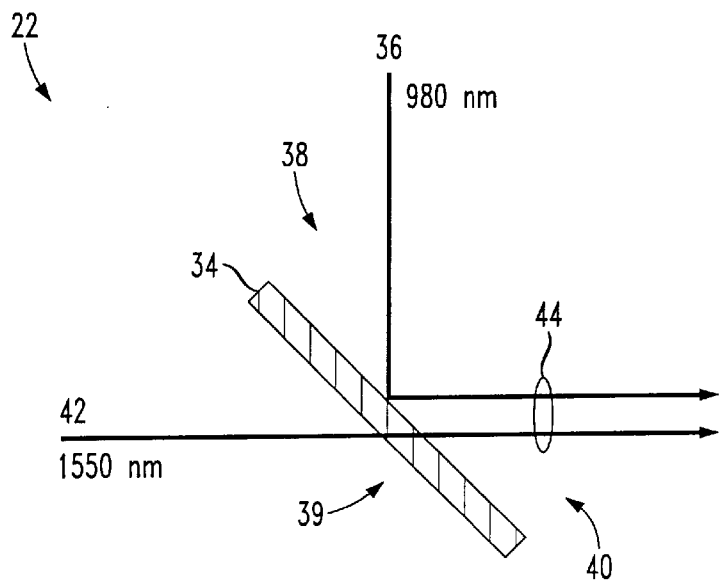
FIGS. 2a–2d are diagrams of wavelength division multiplexers according to the invention.

Turning to FIG. 2a, there is shown a diagram of the operation of one form of a wavelength division multiplexer 22. In this embodiment, the WDM 22 comprises a dichroic mirror 34. Mirror 34 is optically coated to reflect light of one wavelength and pass light of a second wavelength. As illustrated for 980 nm pump light 36 and a 1550 nm data signal 42, the pump light 36 is directed to a first input region 38 of the WDM such that it strikes the mirror 34. Mirror 34 is coated to reflect the pump wavelength, and therefore the pump light is reflected from the mirror and directed into an output region 40. The 1550 nm data signal 42 is directed at a second input region 39 on the opposite side of the mirror 34. The data signal 42 passes through the mirror to form a combined output signal 44 in which the pump and data signals 36, 42 are coincident. It can be appreciated that the input signals 36, 42 and the dichroic mirror 34 must be aligned properly in order for the multiplexing to occur.

Figure 2B:
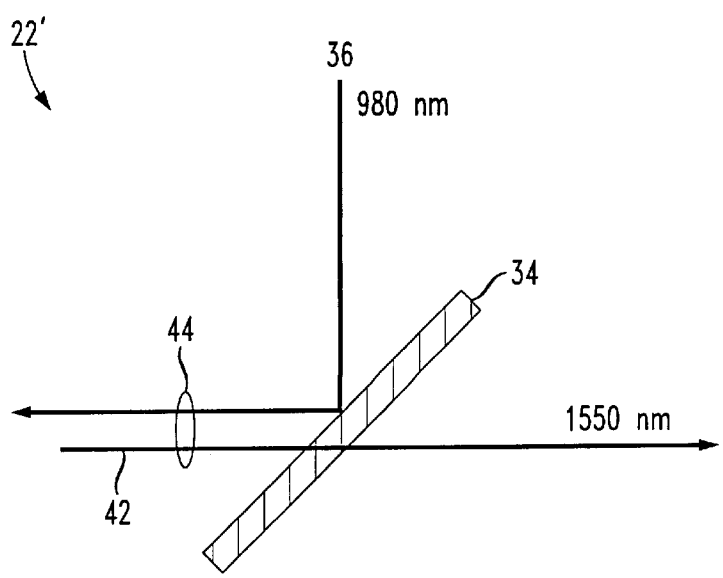
Figure 2C:
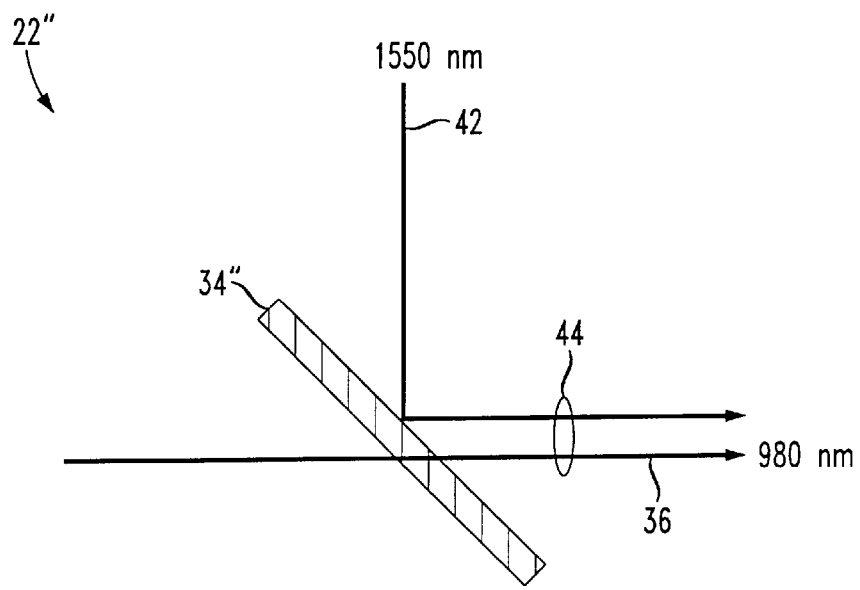

Other configurations for the WDM 22 are also possible. For example, a WDM 22' can be provided where the direction of the pump light 36 opposes that of the data signal 42, as shown in FIG. 2b. Further, a dichroic mirror which reflects the data signal and transmits the pump light may be used. Such an arrangement is shown in FIG. 2c. WDM 22" includes a dichroic mirror 34" which transmits 980 nm light and reflects 1550 nm light. In this arrangement, the design of the coatings on the mirror to cause it to function as a dichroic mirror that is highly transmissive with respect to the shorter wavelength pump light is simplified when the pump light 36 has a known polarization.

Figure 2D:
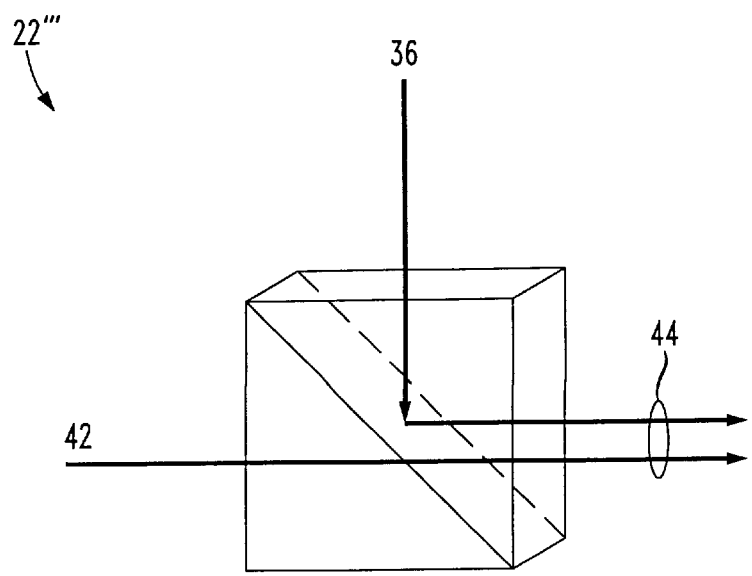

Other devices may also be used for the WDM. For example, a prismatic (or dichroic) cube may be used instead of a dichroic mirror. Prismatic cube beam splitters and multiplexers are constructed by cementing two precision right angle prisms together with the appropriate interference coating on the hypotenuse surfaces. Such a prismatic cube 22''' is illustrated in FIG. 2d.

In additional to requiring the aligning of the signals relative to the WDM assembly 22, the resulting optically multiplexed signal 44 must be directed into the output fiber 28. Unlike conventional systems, fiber 28 according to the invention is multi-mode at the pump light wavelength. Therefore, the output signal can be more easily be focused into the fiber's core than if the core were narrow enough to be singlemode at the pump wavelength.

Figure 3:
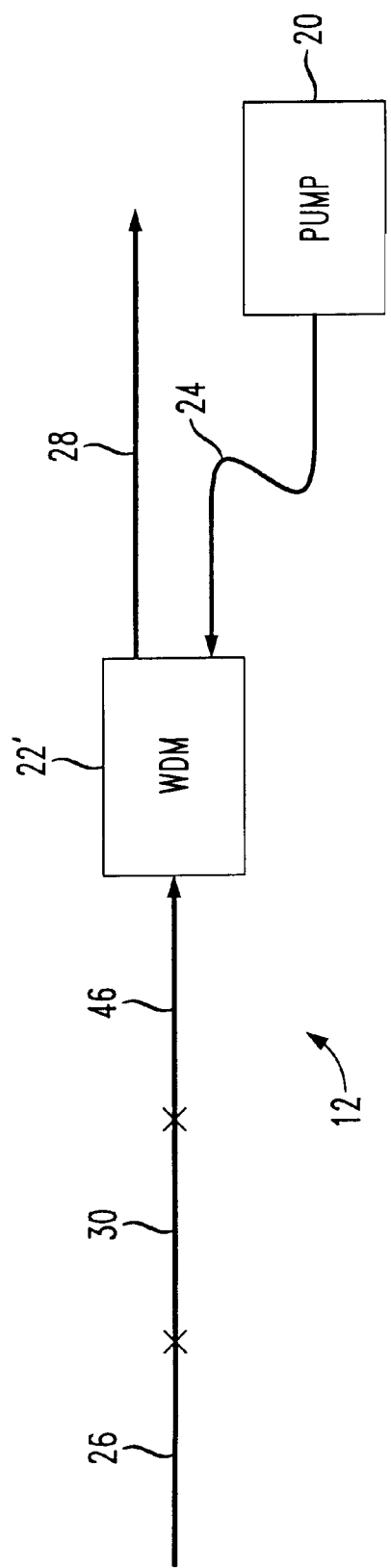
FIG. 3 is a schematic illustration of a reverse pumping erbium doped fiber amplifier according to the invention.

The amplifier 10, illustrated in FIG. 1, is arranged in a forward pumping configuration, where the pump signal 36 and the data signal 42 both travel in the same direction. The present invention may also be configured in a reverse pumping arrangement 12, such as shown in FIG. 3 perhaps using the WDM 22' of FIG. 2b. In this arrangement, the pump light is directed into the WDM 22' such that it travels in the opposite direction than the data signal. Rather than placing the doped fiber 30 on the output of the WDM 22 (as in FIG. 1), the fiber 30 is placed between the fiber 26 carrying the input data signal and the WDM 22'. An additional lead fiber 46 may be placed between the doped fiber 30 and the WDM 22' so that the doped fiber 30 may be easily replaced when necessary. According to the invention, fiber 46 and doped fiber 30 are both multi-mode at the pump light wavelength and single mode at the input (and output) data signal wavelength. Because the pump light is not carried in a single mode fiber, alignment of the various optical and fiber components is simplified.

Figure 4:
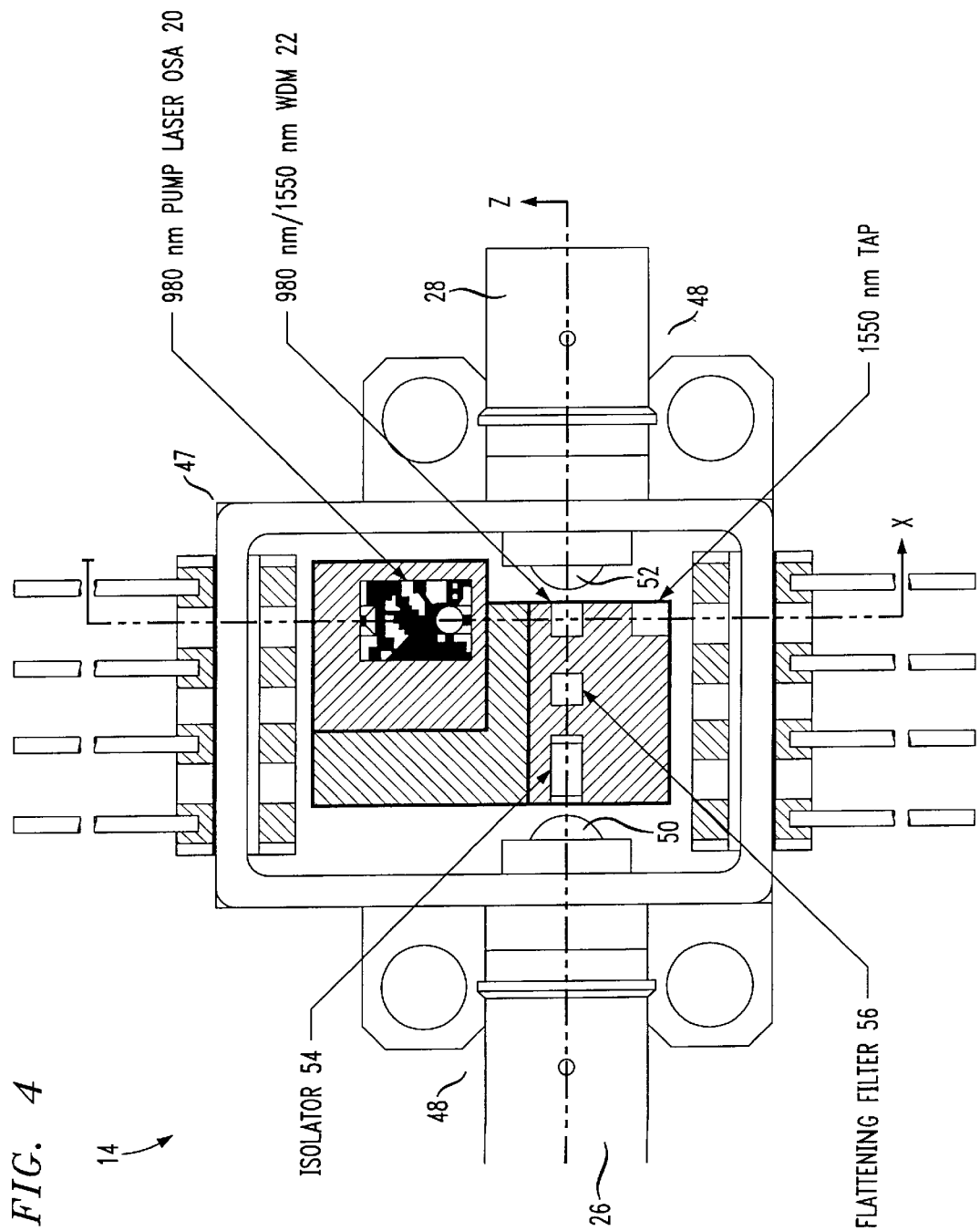
FIG. 4 is a detailed plan view of a preferred arrangement of a wavelength division multiplexer module.

Turning to FIG. 4 there is shown a detailed plan view of a preferred embodiment of a WDM module 14 for an EDFA utilizing optical fibers configured according to the present invention. Advantageously, the pump laser optical subassembly 20 and the WDM 22 are both integrated into an assembly housing 47. The output of the pump 20 is aligned with the appropriate portion of the WDM 22 to eliminate the need to use an intermediate optical fiber between these elements, thus reducing the number of necessary components. The input and output optical fibers 26, 28 are coupled with the assembly 47 using couplers 48. A lens 50 is fitted in alignment with the output of fiber 26 to collimate the light beam from fiber 26 and direct it toward the WDM 22. Preferably, an isolator 54 is provided to receive the light from lens 50 and prevent any reverse signal leakage. In addition, a flattening filter 56 is preferably located after the isolator and is used to equalize the input signal intensity around the 1550 nm wavelength, and thereby provide a more even amplification of the entire input data signal spectrum.

A second lens 52 receiving the is provided at the opposite end of the WDM 22. Lens 52 is used to focus the collimated beam, which contains both the data signal 42 and the pump light 36 into the output fiber 28. Because fiber 28 is single mode at the data signal wavelength and multi-mode at the pump light wavelength, fibers 26 and 28 can be formed of the same type and size of fiber. This arrangement makes it easier to focus the light on the internal device components because the same lenses 50, 52 can be used on both sides. This arrangement also provides for a better optical coupling between the input and the output, thus reducing mode mismatch and signal loss as compared to conventional arrangements in which input and output fibers have different sizes.

A further advantage to using multi mode fibers according to the invention in a WDM module 14, such as shown in FIG. 4, is a generally simplified optical assembly. Typically, "internal" laser devices, such as a semiconductor laser, have a light output which is not rotationally symmetric. Instead, the output mode is wider along one axis, which is generally parallel to the top and bottom surfaces of the device.

Because of the small core size in the fiber, it is difficult to couple a non-symmetric light output to a round single mode fiber without using relatively complicated optics. However, a multi-mode fiber used in the manner discussed above will better accommodate the asymmetric light beam because of its larger core size, thus, allowing for the use of simpler and less expensive optics.

While the invention has been particularly shown and described with reference to the preferred embodiments thereof, it will be understood by those skilled in the art that changes in form and details may be made therein without departing from the spirit of the scope of the invention.

We claim:

1. A fiber amplifier assembly comprising:

a housing;

a wavelength division multiplexer (WDM) situated within said housing and having a first input region for receiving a data signal of a first wavelength, a second input region for receiving pump light of a second wavelength shorter than said first wavelength, and an output region providing an output signal comprising a combination of said data signal and pump light;

a first optical fiber suitable for transmitting said data signal via single-mode propagation and having a first end coupled to said assembly;

a first lens situated between the first end of said first fiber and said WDM and directing said data signal into the first input region of the WDM;

a pump laser optical sub assembly (OSA) situated within said housing and generating said pump light, said OSA oriented to direct said pump light into said second input region of the WDM;

a second optical fiber suitable for transmitting said output signal combination via single mode propagation of said data signal and multi-mode propagation of said pump light, and having a first end coupled to said assembly; and a second lens situated between the output region of the WDM and the first end of said second fiber and directing said output signal into said second optical fiber.

2. The assembly of claim 1, wherein said first wavelength is approximately 1550 nm and said second wavelength is approximately 980 nm.

3. The assembly of claim 1, wherein said second fiber contains a dopant.

4. The assembly of claim 3, where said dopant is erbium.

5. The assembly of claim 1, further comprising an optical isolator situated between the first end of said first fiber and said WDM.

6. The assembly of claim 1, further comprising an optical flattening filter situated between the first end of said first fiber and said WDM.

7. A fiber amplifier comprising:

a housing;

a wavelength division multiplexer (WDM) situated within said housing and having a first input region for receiving a data signal of a first wavelength, a second input region for receiving pump light of a second wavelength shorter than said first wavelength, and an output region providing an output signal comprising a combination of said data signal and pump light;

a first optical fiber suitable for transmitting said data signal via singlemode propagation and having a first end coupled to said assembly, the data signal being directed into the first input region of the WDM;

a source of pump energy generating said pump light, said pump light being directed into said second input region of the WDM;

a second optical fiber suitable for transmitting said output signal combination via single model propagation of said data signal and multi-mode propagation of said pump light, and having a first end coupled to said assembly; and at least one lens situated between the first end of the first fiber and the second of the second fiber to focus light containing the data signal into the second fiber.

8. The amplifier of claim 7, wherein the at least one lens comprises a lens situated between the first end of the first fiber and the WDM and directing said data signal into the first input region of the WDM.

9. The amplifier of claim 7, wherein the at least one lens comprises a lens situated between the output region of the WDM and the first end of the second fiber and directing the output signal into the second optical fiber.

10. The amplifier of claim 7, wherein the at least one lens comprises:

a first lens situated between the first end of the first fiber and the WDM and directing said data signal into the first input region of the WDM; and a second lens situated between the output region of the WDM and the first end of the second fiber and directing the output signal into the second optical fiber.

11. The amplifier of claim 7, wherein the source of pump energy comprises a pump laser optical sub assembly (OSA) situated within the housing and generating the pump light, the OSA oriented to direct said pump light into the second input region of the WDM.

* * * * *